United States Patent
Raz et al.

(10) Patent No.: US 12,056,580 B2
(45) Date of Patent: Aug. 6, 2024

(54) METHOD AND APPARATUS FOR ENHANCING EFFECTIVITY OF MACHINE LEARNING SOLUTIONS

(71) Applicant: International Business Machines Corporation, Armonk, NY (US)

(72) Inventors: Orna Raz, Haifa (IL); Marcel Zalmanovici, Kiriat Motskin (IL); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 1103 days.

(21) Appl. No.: 16/662,090

(22) Filed: Oct. 24, 2019

(65) Prior Publication Data
US 2021/0125080 A1    Apr. 29, 2021

(51) Int. Cl.
*G06N 20/00* (2019.01)
*G06F 18/23* (2023.01)
(Continued)

(52) U.S. Cl.
CPC ............ *G06N 20/00* (2019.01); *G06F 18/23* (2023.01); *G06F 18/24* (2023.01); *G06N 3/126* (2013.01)

(58) Field of Classification Search
CPC ...... G06N 3/126; G06N 20/00; G06K 9/6218; G06K 9/6267
See application file for complete search history.

(56) References Cited

U.S. PATENT DOCUMENTS

| 9,235,813 B1 | 1/2016 | Qian et al. |
| 2019/0163666 A1 | 5/2019 | Cakmak et al. |

FOREIGN PATENT DOCUMENTS

| EP | 3161733 | 5/2017 | |
| NL | 01/159610 A2 * | 8/2001 | ............ G06F 17/30 |
| WO | 2019002603 | 1/2019 | |

OTHER PUBLICATIONS

Amershi, A., et al, ModelTracker: Redesigning Performance Analysis Tools for Machine Learning, [retrieved Dec. 12, 2022]. Retrieved from Internet:<https://dl.acm.org/doi/abs/10.1145/2702123.2702509> (Year: 2015).*

(Continued)

*Primary Examiner* — Miranda M Huang
*Assistant Examiner* — Bart I Rylander
(74) *Attorney, Agent, or Firm* — Matthew Zehrer

(57) ABSTRACT

A method, system and computer program product, the method comprising: creating a model representing under-performing cases; from a case collection having a total performance, and which comprises for each of a multiplicity of records: a value for each feature from a collection of features, a ground truth label and a prediction of a machine learning (ML) engine, obtaining one or more features; dividing the records into groups, based on values of the features in each record; for one group of the groups, calculating a performance parameter of the ML engine over the portion of the records associated with the group; subject to the performance parameter of the group being below the total performance in at least a predetermined threshold: determining a characteristic for the group; adding the characteristic of the group to the model; and providing the model to a user, thus indicating under-performing parts of the test collection.

20 Claims, 2 Drawing Sheets

Figure 1:
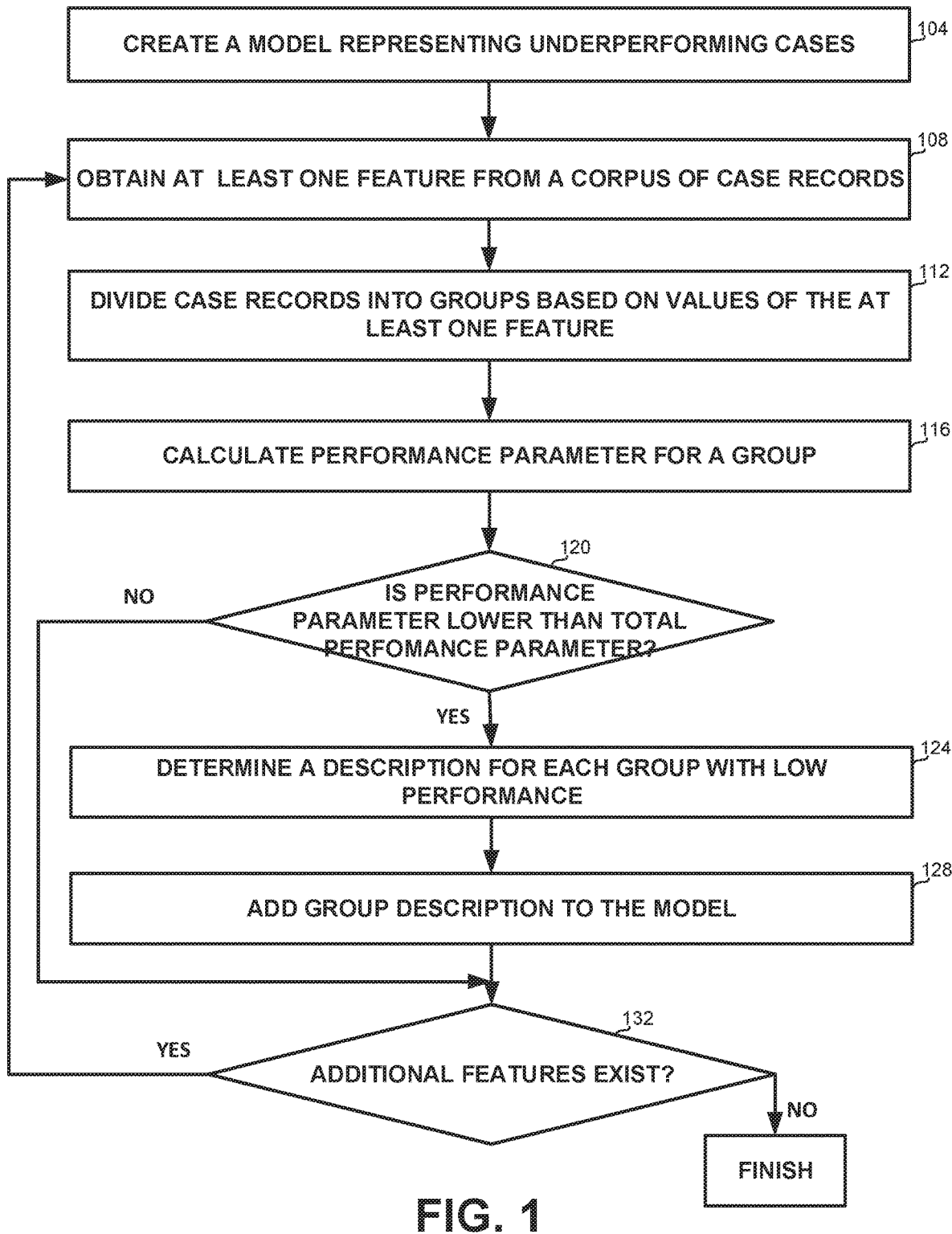

(51) Int. Cl.
*G06F 18/24* (2023.01)
*G06N 3/126* (2023.01)

(56) References Cited

OTHER PUBLICATIONS

Piao, M., et al, Discovery of Significant Classification Rules from Incrementally Inducted Decision Tree Ensemble for Diagnosis of Disease, [retrieved Dec. 12, 2022]. Retrieved from Internet:<https://link.springer.com/chapter/10.1007/978-3-642-03348-3_60> (Year: 2009).*

Simard, P., et al, ICE: Enabling Non-Experts to Build Models Interactively for Large-Scale Lopsided Problems, [received Nov. 29, 2023]. Retrieved from Internet:<https://arxiv.org/abs/1409.4814> (Year: 2014).*

Barga, R., et al, Predictive Analytics with Microsoft Azure Machine Learning Second Edition, Chapter 2, [received Nov. 30, 2023]. Retrieved from Internet:<https://link.springer.com/chapter/10.1007/978-1-4842-1200-4_2> (Year: 2015).*

\* cited by examiner

METHOD AND APPARATUS FOR ENHANCING EFFECTIVITY OF MACHINE LEARNING SOLUTIONS

TECHNICAL FIELD

The present disclosure relates to machine learning systems in general, and to a method and apparatus for determining areas in which a machine learning system underperforms, in particular.

BACKGROUND

Computerized devices control almost every aspect of our life—from writing documents to controlling traffic lights. Within computerized systems, Artificial Intelligence (AI) systems, and in particular Machine Learning (ML) systems are becoming more and more prevalent.

Two main types of machine learning are supervised learning and unsupervised s learning.

In unsupervised learning, the machine builds a mathematical model from a set of data which contains only inputs and no desired output. Unsupervised learning algorithms may be used to structure the data, for example by grouping or clustering similar items, thus discovering patterns and important features within the data.

In supervised learning, the machine builds a mathematical model by training upon a set of data records, wherein each such record contains the inputs and one or more labels indicating the desired outputs, referred to as "ground truth". For example, a task may be determining whether a woman having certain weight, age, city and clinical data, has breast cancer or not, and the ground truth may be a formal medical diagnosis of whether the woman indeed has breast cancer. The machine then needs to determine the output for a given data set. For example, given the weight, age, city and clinical data of a woman, the machine learning engine after being trained needs to predict whether the woman has breast cancer or not. Thus, whether a machine learning engine provided a right or wrong answer can be determined by comparing the output predicted by the engine to the ground truth, e.g., a label given to the case by a human.

BRIEF SUMMARY

One exemplary embodiment of the disclosed subject matter is a computer-implemented method comprising: creating a model representing underperforming cases; from a case collection associated with a total performance parameter, and which comprises for each of a multiplicity of case records: a value for each feature from a collection of features, a ground truth label and a prediction of a machine learning engine, obtaining one or more features; dividing the case records into two or more groups, based on values of the features in each of the case records, such each of the groups has a portion of the case records associated therewith; for a group of the two or more groups, calculating a performance parameter of the machine learning engine over the portion of the case records associated with the group; subject to the performance parameter of the group being below the total performance parameter in at least a predetermined threshold: determining a characteristic for the group; and adding the characteristic of the group to the model; and providing the model to a user, thus indicating under-performing parts of the test collection.

Another exemplary embodiment of the disclosed subject matter is a system having a processor, the processor being adapted to perform the steps of: creating a model representing underperforming cases; from a case collection associated with a total performance parameter, and which comprises for each of a multiplicity of case records: a value for each feature from a collection of features, a ground truth label and a prediction of a machine learning engine, obtaining one or more features; dividing the case records into two or more groups, based on values of the features in each of the case records, such each of the groups has a portion of the case records associated therewith; for a group of the two or more groups, calculating a performance parameter of the machine learning engine over the portion of the case records associated with the group; subject to the performance parameter of the group being below the total performance parameter in at least a predetermined threshold: determining a characteristic for the group; and adding the characteristic of the group to the model; and providing the model to a user, thus indicating under-performing parts of the test collection.

Yet another exemplary embodiment of the disclosed subject matter is a computer program product comprising a non-transitory computer readable medium retaining program instructions, which instructions when read by a processor, cause the processor to perform: creating a model representing underperforming cases; from a case collection associated with a total performance parameter, and which comprises for each of a multiplicity of case records: a value for each feature from a collection of features, a ground truth label and a prediction of a machine learning engine, obtaining one or more features; dividing the case records into two or more groups, based on values of the features in each of the case records, such each of the groups has a portion of the case records associated therewith; for a group of the two or more groups, calculating a performance parameter of the machine learning engine over the portion of the case records associated with the group; subject to the performance parameter of the group being below the total performance parameter in at least a predetermined threshold: determining a characteristic for the group; and adding the characteristic of the group to the model; and providing the model to a user, thus indicating under-performing parts of the test collection.

THE BRIEF DESCRIPTION OF THE SEVERAL VIEWS OF THE DRAWINGS

Figure 2:
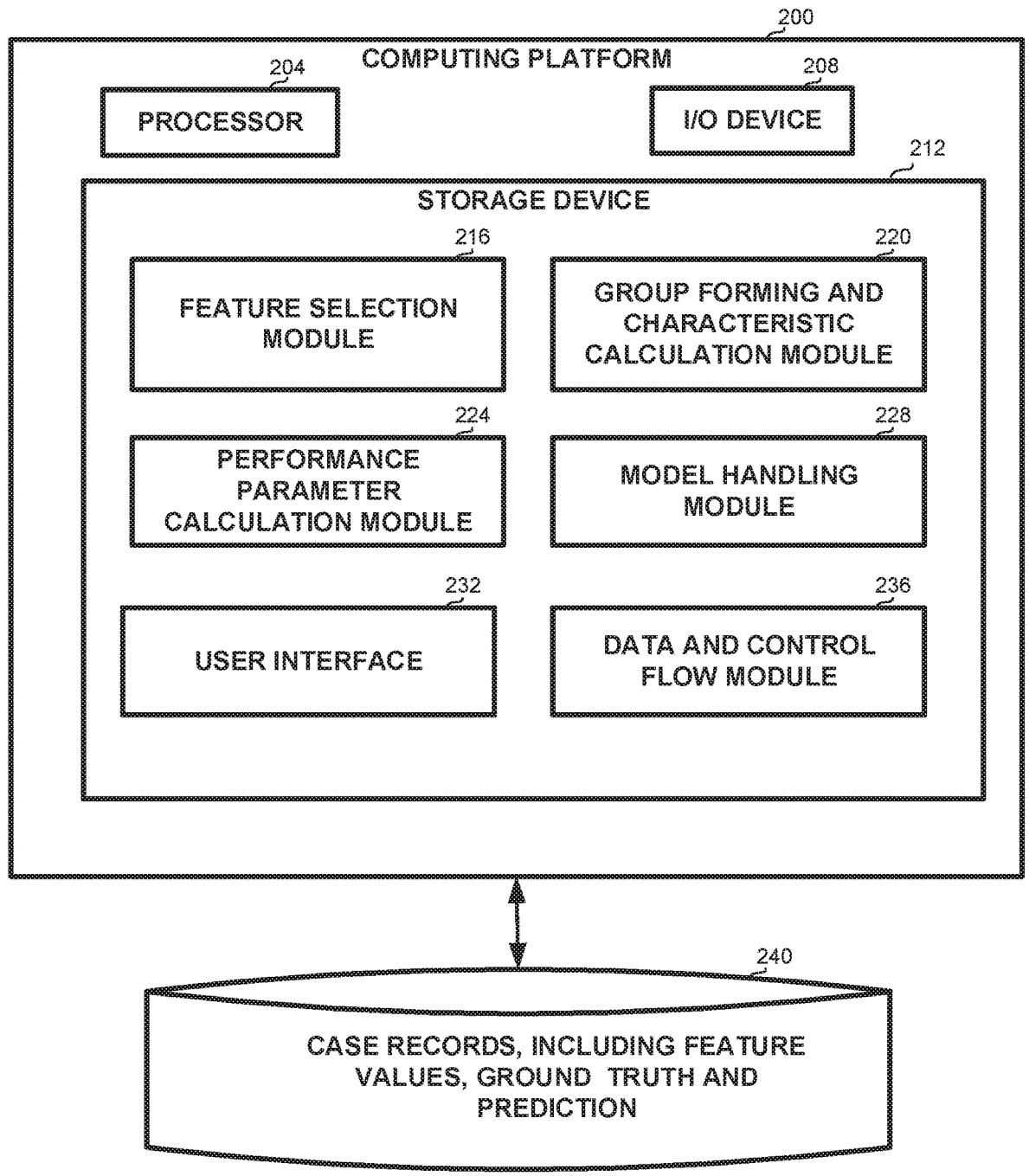

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 1 shows a flowchart diagram of a method for discovering areas in which a machine learning engine underperforms, in accordance with some exemplary embodiments of the disclosed subject matter; and FIG. 2 showing a block diagram of a system configured for discovering areas in which a machine learning engine underperforms, in accordance with some exemplary embodiments of the disclosed subject matter.

DETAILED DESCRIPTION

Machine Learning (ML) systems is a general name for methods, algorithms and devices, also referred to as engines, executed by computers performing specific tasks, while relying on learned patterns or inference rather than explicit instructions. Machine learning algorithms build a mathematical model based on sample data, known as "training data", and use the model to make predictions or decisions without being explicitly programmed to perform the task. Machine learning algorithms are used in more and more areas, including finance, health, agriculture, social studies, science, and others, in a wide variety of applications, especially where it is difficult or infeasible to develop a conventional or explicit algorithm for effectively performing a task. Such applications may include but are not limited to data mining which relates to making predictions based on past cases, computerized vision, filtering items, or the like.

Of particular interest are ML engines based on supervised learning. Learning includes a development stage and an operation phase, wherein the development stage includes a training phase and an optional testing phase. The operation of an ML engine can generally be described as receiving one or more cases, wherein each case comprises a value for each feature from a collection of features, and providing a prediction for the case. For example, a test case may include the clinical data, age, weight and city of a woman, and the engine may predict whether the woman has breast cancer. The features may thus be the age, weight, city, and parameters of the clinical data, such as blood pressure, heart rate, lab measurements, or the like. Each feature may be discrete with a finite or infinite number of values, or continuous with or without limits, or the like. It will be appreciated that the disclosure is not limited to features having numerical values, and may equally operate with any other feature having groupable values, such as a character string. During development, the received cases may be records from a training data set, wherein during the testing phase the cases are preferably records from a test data set that were not used for training, and are intended to represent the expected distribution of data records during operation. In operation, the cases may be new incoming data records. The disclosure may be used at either stage, provided that a ground truth is available for the used cases, in order to determine the ML performance.

A global performance indicator of the performance of an ML engine may be obtained given the ground truth. For cases in which the prediction is a binary value, the performance can be obtained by dividing the number of correct predictions by the total number of the cases. In other cases, any other metric can be applied between values of the prediction, and averaged over the cases.

Areas of a test case may be defined by a value or range of values of one or more features in one or more cases. For example, an area of the case described above may be cases of women aged 32-45, cases of women aged 12-32 and living in a particular city, or the like.

One technical problem is a need to identify areas of the test cases for which the performance of the engine is particularly low, i.e., the performance indicator for these areas is low relatively to the general performance Thus, although the overall performance of the engine may be acceptable, it may be important to highlight such underperforming areas such that a user can take corrective action such as further training, using a different or additional ML engine, or another tool, human analysis, or the like.

Another technical problem is the need to convey to a user the areas in which the engine underperformed, in a conceivable manner. Given such description, a user can enhance the engine by training with further cases that may remedy its deficiency, or apply other solutions as described above.

One technical solution comprises the generation of a Cartesian model, designed to comprise a description of areas in which the engine provides deficient results.

First, one or more first features may be selected for ML performance problems involving a single feature, also referred to as 1-way interactions, and the values present in the test corpus for the features may be divided into two or more groups. Grouping can be performed automatically in accordance with each discrete value in the case of a small number of discrete values for a feature, by clustering, by defining ranges such that each range has an equal number of cases, by ranges in which the mass of the cases relies within one group, based on domain knowledge, or the like. In some embodiments, the grouping may also be performed manually by a user. The performance of the engine on the cases associated with each group, wherein said association may be based on the value or values of the feature in each case, may then be evaluated. For binary predictions, the performance may be determined in accordance with the percentage of cases for which the prediction was correct, out of the number of cases associated with the group. For other prediction types, the performance may be determined in accordance with the average distance between the prediction and the ground truth as measured using any required metrics, or using any other ML performance evaluation metric, such as but not limited to F1 Score for classification, root-mean-square error (RMSE), coefficient of determination (R2) for regression score, or the like. This percentage may then be compared to the general performance of the test corpus. If the performance of the engine for a group is deficient, a description of the group may be generated, for example "age 35-45", "a northern city", or the like.

It will be appreciated that an underperformance assessment and corresponding description can also be provided for a multiplicity of groups in regard of the same feature, for example the engine may underperform for women of ages 20-25 and 50-60.

The division and assessment can be performed for a multiplicity of features concurrently, sequentially, or the like. Thus, multiple entries can be added to the Cartesian model, wherein each entry is associated with one feature and one group, and wherein multiple entries may be associated with the same feature, such as "ages 20-25", "ages 50-60", "having overweight of at least 10 kg", or the like.

Another technical solution relates to identifying ML problems that involve n features, also referred to as n-way interactions, for example 2-way or 3-way interactions, i.e., groups of cases for which the engine underperforms, wherein the group is characterized by values or value ranges of n features, for example, "aged 40-45 AND living in a northern city", a combination of values or value groups of medical parameters, or the like.

While identifying 1-way interactions requires dividing the values of a feature into groups as described above, identifying 2-way (or more) interactions requires dividing the cases into groups characterized by a value combination of two or more features. Such division may be performed in a multiplicity of ways.

One exemplary way involves optimizing, i.e., determining a subarea of an area common to a first area defined by a first value or value range of a first feature, and a second value or value range of a second feature, such that the subarea has worse performance than the common area.

Another exemplary way involves training a decision tree, in which each level relates to dividing the range of values of one feature, such that at least one leaf of the tree has a performance worse than the total performance over the test corpus, wherein the term worse may relate to any mathematically lower performance, or to performance that is lower in at least predetermined threshold.

One technical effect of the disclosure provides for identifying areas in which an ML engine is deficient. Once defined, new cases relevant to such areas can be obtained, a ground truth may be obtained for the cases, and the ML engine can be further trained, which will improve the performance on these areas as well as the total performance.

Another technical effect of the disclosure provides for conveying to a user the characteristics of the underperforming areas. By obtaining and describing areas by values or value groups of one or more features, whether independent of each other or combined, s the user can obtain cases associated with these areas, and improve the deficient areas.

Yet another technical effect of the disclosure provides for assessing the distribution of the performance over the test corpus. For example, if no areas in which the performance is significantly deficient exist, then the performance is significantly uniform and the expected performance may be known.

Referring now to FIG. 1, showing a flowchart diagram of a method for discovering areas in which a machine learning engine underperforms, in accordance with some exemplary embodiments of the disclosed subject matter.

It will be appreciated that the case records used for determining underperforming areas of the ML engine are other than those used for training the engine. However, after correcting the corpus, possibly by adding case records of these areas, the ML engine may be re-trained or otherwise enhanced, to improve future performance on these areas.

On step 104, when analyzing the behavior of a test corpus comprising a multiplicity of case records for which predictions are given by an ML engine, a model such as a Cartesian model may be created. Each entry in the model will represent an area of a test corpus, i.e., one or more characteristics of cases for which the performance of the ML engine is below its total performance. Thus, the model may be adapted to receive for each entry one or more features and a value or value group associated with each such feature. For example, {("Age", 20-25)}, or {("Age", 20-25), ("Geographic Area" "North")}.

On step 108, at least one feature from the case records of a corpus may be selected. A feature may need to have at least a predetermined number of different values in order to be selected. In some embodiments, all features of a corpus may be analyzed.

On step 112, the case records may be divided into groups in accordance with the values assigned within each test record to the features selected on step 108.

Division may be performed in a multiplicity of manners. First, for determining 1-way interactions, the cases may be divided in accordance with each feature independently.

For a feature having a collection of discrete values, for example up to 10 different values, each group may comprise case records in which the feature is assigned the corresponding value;

For a feature having continuous values or a multiplicity of discrete values, for example more than 10 discrete values, the values may be clustered such that cases are assigned to each group are those in which the value of the feature is assigned to the corresponding cluster, wherein the values of the feature within each cluster are closer to each other than values belonging to different clusters. It will be appreciated that clustering can use any required clustering method, such as but not limited to k-means clustering, and may employ any relevant metrics. For example, in scalars a simple arithmetic subtraction metric may be used, in locations a distance may be used, or the like.

In further embodiments, the feature values may be binned, i.e., divided into groups such that the number of case records having feature values associated with each group is substantially the same, within rounding or other limitations. The number of groups may be predetermined, may depend on the number of records, on the range of values, or the like. For example, if it is required to split test case records into three equally-sized bins in accordance with the age feature, the result may happen to be a first age group of 0-32, a second age group of 32-45, and a third age group of 45-100.

For n-way interactions, for example groupings based on the combination of values of two, three or any other number of features, multiple other methods may be used for dividing the case records into groups.

In one embodiment, and in the exemplary case of 2-way interactions, two one-way divisions as described above may be made. Denote by $A_1$ and $B_1$ groups of the case records formed by dividing the corpus using feature A and feature B, respectively, wherein each of groups $A_1$ and $B_1$ has a low performance relative to the whole corpus. For example, denote by $p(A_1)$ the percentage of wrong predictions within $A_1$, and similarly $p(B_1)$. If A and B are unrelated, then it is expected that the number of wrong predictions within a subgroup C of records belonging to $A_1$ and to $B_1$ is about $N*p(A_1)*p(B_1)$, wherein N is the total number of case records. However, it would be beneficial for a user to find a subgroup D of C, such that $p(D)>p(C)$, i.e., the percentage of wrong predictions in D is higher than the percentage of wrong predictions in C. Multiple optimization methods may be used for locating such a D subgroup within C, for example genetic algorithms, linear programming, or the like. It is guaranteed that such D subgroup is indeed of low performance relative to each of groups $A_1$ and $B_1$, and even more so relative to the whole corpus. It may be useful for a user to obtain an indication thereof.

In another embodiment, a decision tree can be trained upon the test case records. A decision tree is representation of a multi-stage decision process. During processing of each case, at each stage, also referred to as a level, it is determined to which subgroup the value of a particular feature belongs. In a decision tree, each leaf, i.e., the lowest level of the decision tree may thus be associated with zero, one or more case records whose feature values complied with the decisions at each level of the path leading to the leaf. When training a decision tree in accordance with the disclosure, the target label is a binary indication of whether the prediction of the ML solution is the same or different that the ground truth (the original target label). Also, each leaf in the decision tree may be required to be associated with a minimum number of records, in order for the group of cases assigned to the leaf to be of statistical significance. If a leaf does not meet this requirement, the leaf, or a branch including the leaf may be unified with a corresponding sibling. A decision tree may be trained using any algorithm, such as but not limited to Iterative Dichotomiser 3 (ID3), C4.5 classification, or Classification and Regression Tree (CART).

In some cases, the multiplicity of case records may be divided into at least two groups of case records according to values of a feature, based on applying a Highest Posterior Density (HPD) method, such that one group of the at least two groups comprises cases for which the values of the at least one feature falls within a HPD interval. It will be appreciated that multiple levels may relate to the same feature. For example, a first level may separate between cases in which a woman is of the age 0-32, 32-45 or 45-100, then for the ages of 32-45 whether her blood pressure is below or above 90, and if it is above 90, whether her age is 32-40 or 40-45.

The case records associated with each leaf of the decision tree thus form a group.

It will be appreciated that the decision tree forms groups that may be more explicable to a user than the subgroups of the group interactions between two or more feature values described above, as each group can be represented using a series of decisions, i.e., subranges of the values of a feature. The decision tree may also be more efficient in locating underperforming areas, as it may also find groups defined by combinations of two or more value ranges, which are not necessarily subgroups of value ranges of each single feature.

On step 116, a performance parameter may be calculated for each group. It will be appreciated that if multiple divisions have been made, in accordance with multiple single features or feature sets, then the performance may be calculated for each group independently. The performance parameter may be calculated by determining the average distance between the predictions made by the ML engine and the ground truth for the cases within the group. The distance for each case may be 0 or 1 for each case in binary predictions, e.g., yes/no. For scalar features, an arithmetic difference may be calculated. In further embodiments, the distance may be determined in accordance with the number of standard deviations from an average calculated for the ground truth of each group.

It will be appreciated that although steps 108, 112 and 116 are disclosed as separate steps, they may be performed in any other manner. For example, the feature selection may be performed concurrently with the grouping. In another embodiment, multiple division into multiple group sets may be performed, followed by performance calculations for each group, or the like.

On step 120 it may be determined whether the performance of any of the formed groups is lower than the total performance of the test corpus. Lower may relate to the performance being lower in more than a predetermined threshold, wherein the threshold may be expressed in absolute difference, in standard deviations, or the like.

If the group performance is not lower than the total performance, then the group is not of particular interest, and execution may continue to step 132 detailed below.

If any of the groups is indeed of low performance, a description may be determined for the group. The description may include a characteristic of the group, such as the feature names and the values or ranges of values of the features upon which the groups is formed, an assessment of the performance, optionally the performance of the whole corpus, an average of the feature value for the whole corpus, or the like.

On step 128, the group description, optionally after being formatted, may be added to the model crated in step 104, such as the Cartesian model, such that a user can add cases corresponding to the description, and train the ML engine on these cases. In some embodiments, only the characteristic of the group may be added to the model.

On step 132 it may be determined whether additional features exist upon groups s can be formed. If no such features exist, execution may finish, otherwise, execution may return to step 108 for searching for further features.

It will be appreciated that although steps 108, 112, 116, 120, 124 and 128 are disclosed as separate steps, they may be performed in any other manner. For example, the feature selection may be performed concurrently with the grouping. In another embodiment, multiple division into multiple group sets may be performed, followed by performance calculations for each group, or the like.

It will be appreciated that all the group forming methods, whether 1-way or n-way are heuristic, and thus more optimal groups may exist which are not found. However, each group found to be underperforming may be of interest to a user is guaranteed to indeed be underperforming, and a user can determine whether it is worth the effort of collecting relevant data for enhancing the engine.

Referring now to FIG. 2 showing a block diagram of a system configured for discovering areas in which a machine learning engine underperforms, in accordance with some embodiments of the disclosure.

The system may comprise one or more Computing Platforms 200. In some embodiments, Computing Platform 200 may be a server, and may provide services to one or more computer networks associated with one or more clients. In further embodiments, Computing Platform 200 may be the same, or one of the computing platform executing tasks for a client.

Computing Platform 200 may communicate with other computing platforms via any communication channel, such as a Wide Area Network, a Local Area Network, intranet, Internet or the like.

Computing Platform 200 may comprise a Processor 204 which may be one or more Central Processing Units (CPU), a microprocessor, an electronic circuit, an Integrated Circuit (IC) or the like. Processor 204 may be configured to provide the required functionality, for example by loading to memory and activating the modules stored on Storage Device 212 detailed below.

It will be appreciated that Computing Platform 200 may be implemented as one or more computing platforms which may be operatively connected to each other. It will also be appreciated that Processor 204 may be implemented as one or more processors, whether located on the same platform or not.

Computing Platform 200 may comprise Input/Output (I/O) Device 208 such as a display, a pointing device, a keyboard, a touch screen, or the like. I/O Device 208 may be utilized to receive input from and provide output to a user, for example receive parameters from a user, such as threshold under which a group is considered underperforming, display to the user characteristics of the underperforming groups, let the user indicate features to group upon, or the like.

Computing Platform 200 may comprise a Storage Device 212, such as a hard disk drive, a Flash disk, a Random Access Memory (RAM), a memory chip, or the like. In some exemplary embodiments, Storage Device 212 may retain program code operative to cause Processor 204 to perform acts associated with any of the modules listed below, or steps of the method of FIG. 1 above. The program code may comprise one or more executable units, such as functions, libraries, standalone programs or the like, adapted to execute instructions as detailed below.

Storage Device 212 may comprise and Processor 204 may execute one or more machine learning engines (not shown). However, the machine learning engine may be stored on and used by another computing platform, and only the input to the engine, the predictions of the engine and the ground truth may be provided to Computing Platform 200.

Computing Platform 200 can comprise or be operatively connected to Database 240, comprising case records, each including the values for the various features, the prediction of the ML engine, and the ground truth for the record.

Storage Device 212 may comprise Feature Selection Module 216, for selecting a feature or a multiplicity of features relevant to the case records as stored on Database 240, to be analyzed separately or combined, in order to locate a group of test case records for which the machine learning engine underperforms relative to the whole corpus of case records. The feature selection may be performed as detailed in association with step 108 of FIG. 1.

Storage Device 212 may comprise Group Forming and Characteristic Calculation Module 220, for dividing the case records in accordance with the values of the features selected by Feature Selection Module 216. The group forming may be performed as detailed in association with step 112 of FIG. 1.

One or more characteristics may be defined for each group, based for example upon the values of the features.

Storage Device 212 may comprise Performance Parameter Calculation Module 224, for determining the performance of each group formed by Group Forming and Characteristic Calculation Module 220. The performance may be determined as detailed in association with step 116 of FIG. 1.

Storage Device 212 may comprise Model Handling Module 228, for performing operations related to the used model which may be a Cartesian model, for example initial generation thereof, adding an entry to the model, or the like.

Storage Device 212 may comprise User Interface 232 for displaying data and results to a user, receiving instructions from a user, or the like, using I/O device 208.

Storage Device 212 may comprise Data and Control Flow Module 236 responsible for managing the flow of control between the components detailed above, and for managing the data flow such that each component receives or gets access to the data required for its operation.

It will be appreciated that the module description above is exemplary only, that the modules may be arranged differently, and that the division of tasks between the modules may be different. For example, the feature selection and group forming may be implemented as one module, while characteristic calculation may be implemented by another module and activated only for the underperforming groups, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain s and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method to be performed at a computing platform, the method comprising:
training a supervised machine learning engine over a training data set, thereby obtaining a trained machine learning engine;
creating a model, the model is configured to represent areas in which the trained machine learning engine underperforms, the areas are comprising at least one area of characterized by a range of values of one or more feature case records;
executing the trained machine learning engine over a case collection to obtain a multiplicity of predictions for a respective multiplicity of case records in the case collection, each case record of the multiplicity of case records comprises a plurality of values of a respective plurality of features, said executing is performed by a processor of the computing platform;
determining an overall performance parameter of the trained machine learning engine, wherein the overall performance parameter indicates a performance of the trained machine learning engine when executed by said executing over the multiplicity of case records;
identifying the areas in which the trained machine learning engine underperforms by:
automatically selecting a selected feature from the plurality of features;
automatically dividing the multiplicity of case records into at least two groups of case records, said automatically dividing is performed according to values of the selected feature in each of the multiplicity of case records, said automatically dividing comprises dividing the multiplicity of case records into at least a first group of case records having a first range of the values of the selected feature, and into a second group of case records having a second range of the values of the selected feature;
calculating a performance parameter of a group of case records from the at least two groups of case records, the group of case records has a defined range of the values of the selected feature, the performance parameter indicating a performance of the trained machine learning engine when executed by said executing over the group of case records; and
subject to the performance parameter of the group of case records being lesser than the overall performance parameter of the case collection by at least a predetermined threshold:
determining a characteristic for the group of case records, the characteristic representing the defined range of the values of the selected feature in the group of case records, wherein the characteristic comprises a description of the selected feature and of the defined range of the values of the selected feature; and
adding the characteristic of the group of case records to the model; and
providing the model to a user, thereby indicating to the user the areas in which the trained machine learning engine underperforms.

2. The method of claim 1, wherein said identifying is performed independently and at overlapping time periods for at least a first feature and a second feature of the plurality of features, the method further comprising assessing, based on said identifying, a distribution of the performance of the trained machine learning engine when executed by said executing over the multiplicity of case records.

3. The method of claim 1, wherein said automatically selecting the selected feature is performed automatically based on determining whether the selected feature has a predetermined number of different values in the multiplicity of case records, wherein said automatically selecting is performed in order to locate the group of case records for which the trained machine learning engine underperforms relative to the case collection.

4. The method of claim 1, wherein the selected feature comprises at least a first feature and a second feature, and wherein the multiplicity of case records are divided into the at least two groups, based on combinations of values of the first feature and the second feature assigned to each case record in the multiplicity of case records, wherein said automatically dividing is performed using a decision tree, the method comprising training the decision tree using an Iterative Dichotomiser 3 (ID3), a C4.5 classification, or a Classification and Regression Tree (CART), wherein, when training the decision tree, a target label is a binary indication of whether a prediction of the trained machine learning engine is identical to a ground truth label of each case record.

5. The method of claim 1, wherein the case collection comprises a test collection, wherein the trained machine learning engine is not trained on the case collection.

6. The method of claim 1, wherein in response to said providing the model to the user, the user is enabled to add new case records that correspond to the characteristic, to the training data set of the trained machine learning engine, thereby obtaining an updated training data set, and to retrain the trained machine learning engine using the updated training data set.

7. The method of claim 1, wherein the selected feature comprises at least a first feature and a second feature, and wherein the multiplicity of case records are divided into the at least two groups based on combinations of values of the first feature and the second feature assigned to each case record in the multiplicity of case records, wherein said automatically dividing is performed by determining a subgroup of the group of case records having combinations of values of the first feature and the second feature assigned, such that more wrong decisions are associated with the subgroup than with the group, relatively to respective sizes of the subgroup and the group, wherein said determining the subgroup is performed using genetic algorithms or linear programming.

8. The method of claim 1, wherein said automatically dividing comprises dividing the multiplicity of case records into three groups of case records.

9. The method of claim 1, wherein said automatically dividing is performed based on discrete values of the selected feature in each of the case records.

10. The method of claim 1, wherein said automatically dividing is performed based on clustering the values of the selected feature in each of the multiplicity of case records to respective clusters.

11. The method of claim 1, wherein said automatically dividing is based on binning the values of the selected feature into a predetermined number of bins, such that all bins comprise a same number of case records.

12. The method of claim 1, wherein the model is a Cartesian model.

13. The method of claim 1, wherein said identifying comprises selecting, individually, all features of the plurality of features by said automatically selecting.

14. A method to be performed at a computing platform, the method comprising:
    training a supervised machine learning engine over a training data set, thereby obtaining a trained machine learning engine;
    creating a model, the model is configured to represent areas in which the trained machine learning engine underperforms, the areas comprising at least one area characterized by a range of values of one or more features of case records;
    executing the trained machine learning engine over a case collection to obtain a multiplicity of predictions for a respective multiplicity of case records in the case collection, each case record of the multiplicity of case records comprises a plurality of values of a respective plurality of features, said executing is performed by a processor of the computing platform;
    determining an overall performance parameter of the trained machine learning engine, wherein the overall performance parameter indicates a performance of the trained machine learing engine when executed by said executing over the multiplicity of case records;
    identifying the areas in which the trained machine learning engine underperforms by:
        automatically selecting a selected feature from the plurality of features;
        automatically dividing the multiplicity of case records into at least two groups of case records, said automatically dividing is performed according to values of the selected feature in each of the multiplicity of case records, wherein said dividing is performed based on applying an Highest Posterior Density (HPD) method, such that one group of the at least two groups comprises cases for which the values of the at least one feature falls within a HPD interval, said automatically dividing comprises dividing the multiplicity of case records into at least a first group of case records having a first range of the values of the selected feature, and into a second group of case records having a second range of the values of the selected feature;
        calculating a performance parameter of a group of case records from the at least two groups of case records, the group of case records has a defined range of the values of the selected feature, the performance parameter indicating a performance of the trained machine learning engine when executed by said executing over the group of case records; and
        subject to the performance parameter of the group of case records being lesser than the overall performance parameter of the case collection by at least a predetermined threshold:
            determining a characteristic for the group of case records, the characteristic representing the defined range of the values of the selected feature in the group of case records, wherein the characteristic comprises a description of the selected feature and of the defined range of the values of the selected feature; and
            adding the characteristic of the group of case records to the model; and
    providing the model to a user, thereby indicating to the user the areas in which the trained machine learning engine underperforms.

15. A system having a computing platform that comprises a processor, the processor being adapted to perform the steps of:
    training a supervised machine learning engine over a training data set, thereby obtaining a trained machine learning engine;
    creating a Cartesian model, the Cartesian model is configured to represent areas in which the trained machine learning engine underperforms, the areas comprising at least one area characterized ny a range of values of one or more features of case records;

executing the trained machine learning engine over a case collection to obtain a multiplicity of predictions for a respective multiplicity of case records in the case collection, each case record of the multiplicity of case records comprises a plurality of values of a respective plurality of features;

determining an overall performance parameter of the trained machine learning engine, wherein the overall performance parameter indicates a performance of the trained machine learning engine when executed by said executing over the multiplicity of case records;

identifying the areas in which the trained machine learning engine underperforms by:
  automatically selecting a selected feature from the plurality of features;
  automatically dividing the multiplicity of case records into at least two groups of case records, said automatically dividing is performed according to values of the selected feature in each of the multiplicity of case records, said automatically dividing comprises dividing the multiplicity of case records into at least a first group of case records having a first range of the values of the selected feature, and into a second group of case records having a second range of the values of be selected feature;
  calculating a performance parameter of a group of case records from the at least two groups of case records, the group of case records has a defined range of the values of the selected feature, the performance parameter indicating a performance of the trained machine learning engine when executed by said executing over the group of case records; and
  subject to the performance parameter of the group of case records being lesser than the overall performance parameter of the case collection by at least a predetermined threshold:
    determining a characteristic for the group of case records, the characteristic representing the defined range of the values of the selected feature in the group of case records, wherein the characteristic comprises a description of the selected feature and of defined range of the values of the selected feature; and
    adding the characteristic of the group of case records to the Cartesian model; and
  providing the Cartesian model to a user, thereby indicating to the user the area in which the trained machine learning engine underperforms.

16. The system of claim 15, wherein said identifying is performed independently and at overlapping time periods for at least a first feature and a second feature of the plurality of features.

17. The system of claim 15, wherein the selected feature comprises at least a first feature and a second feature, and wherein the multiplicity of case records are divided into the at least two groups, based on combinations of values of the first feature and the second feature assigned to each case record in the multiplicity of case records.

18. The system of claim 17, wherein said automatically dividing is performed using a decision tree, wherein training the decision tree is performed using an Iterative Dichotomiser 3 (ID3), a C4.5 classification, or a Classification and Regression Tree (CART), and wherein, when training the decision tree, a target label is a binary indication of whether a prediction of the trained machine learning engine is identical to a ground truth label of each case record.

19. The system of claim 17, wherein said automatically dividing is performed by determining a subgroup of the group of case records having combinations of values of the first feature and the second feature assigned, such that more wrong decisions are associated with the subgroup than with the group, relatively to respective sizes of the subgroup and the group, and wherein said determining the subgroup is performed using genetic algorithms or linear programming.

20. The system of claim 15, wherein said automatically dividing is performed based on clustering the values of the selected feature in each of the multiplicity of case records to respective clusters, or based on binning the values of the selected feature into a predetermined number of bins, such that all bins comprise a same number of case records.

* * * * *